July 4, 1933. C. A. NEWBERG 1,916,384
COMPOUND COMPRESSION STOP AND WASTE VALVE
Filed April 1, 1929
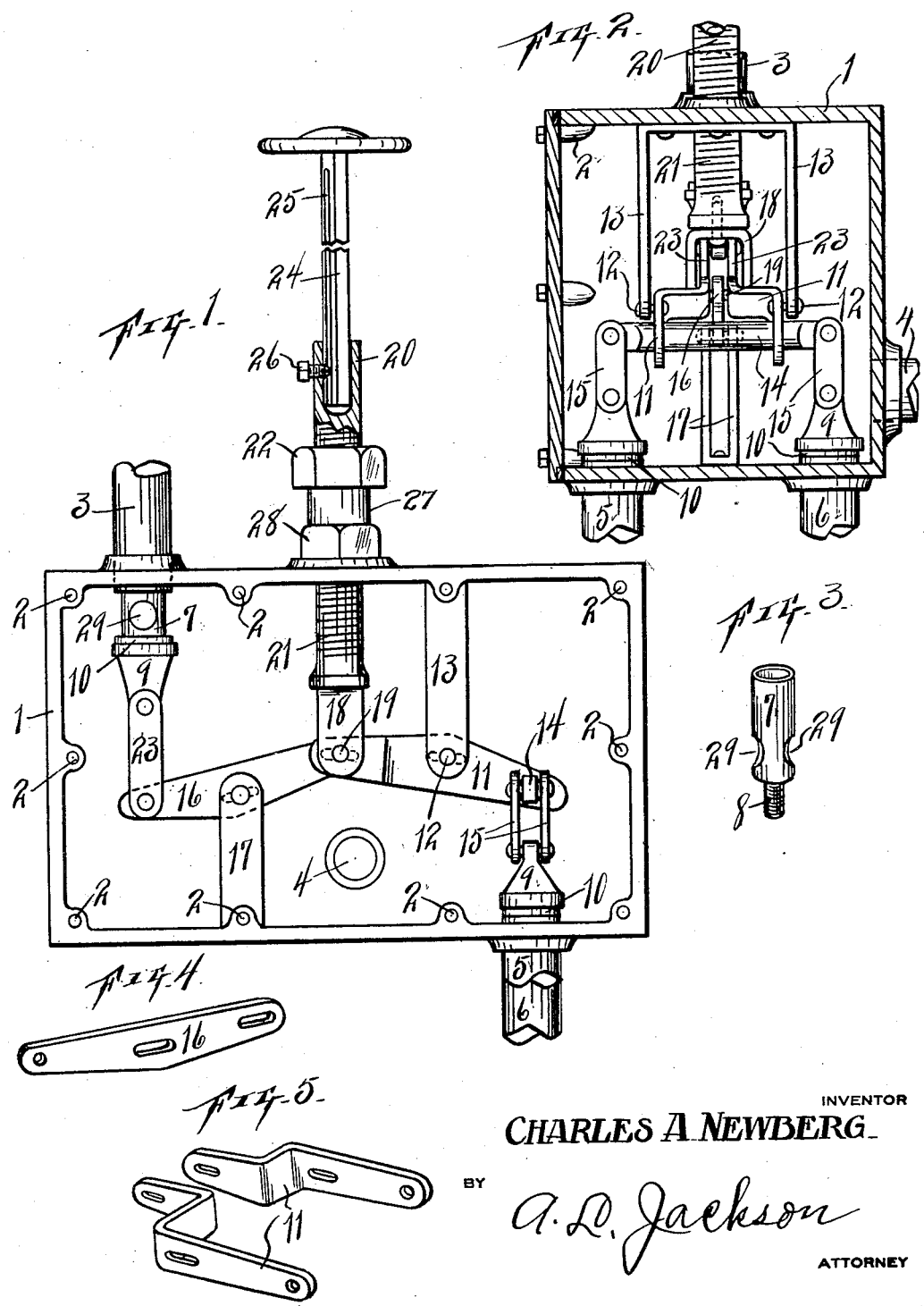
INVENTOR
CHARLES A. NEWBERG
BY *A. L. Jackson*
ATTORNEY Patented July 4, 1933

1,916,384

UNITED STATES PATENT OFFICE

CHARLES A. NEWBERG, OF FORT WORTH, TEXAS

COMPOUND COMPRESSION STOP AND WASTE VALVE

Application filed April 1, 1929. Serial No. 351,806.

This invention relates to valves and it has particular reference to stop and waste valves for use in plumbing systems where it is necessary to cut off the water supply therethrough and drain the pipes, and its principal object resides in the provision of a combination of elements capable of functioning to shut off the water supply from the source to an inside plumbing system, such as a residence, commercial establishment, or the like, controlling both the hot and cold water in the system, draining the pipes in the latter, at one operation.

Another object of the invention resides in the provision of such a valve, or assembly, to prevent the pipes from freezing in cold weather, both inside and outside of the house, by restraining the introduction into the system of water from the street, or source, and allowing the pipes extending to the various outlets throughout the system to be drained of the contents, regardless of whether such contents are hot or cold.

Broadly, the invention seeks to comprehend a device which can be installed at any point intermediate the source and outlets, either under the ground or within the house and which can be readily accessible and operable at all times, regardless of the weather or other conditions, and which will not corrode or otherwise deteriorate or become impaired in its efficient operation.

While the foregoing objects are paramount, other and lesser objects will become manifest as the description proceeds taken in connection with the appended drawing wherein:

Figure 1 is a side elevational view of the invention with the plate removed showing the operating mechanism therein and the inlets and outlets.

Figure 2 is a lateral cross sectional view of one end of the invention, showing the two discharge valves.

Figure 3 is a perspective detail view of the preferred form of valve closure.

Figure 4 is a perspective detail view of one of the levers and arms, and

Figure 5 is a perspective view of the pair of arms operating in conjunction with that shown in Figure 4.

The conventional type of valve designed for the purpose of shutting off the water supply from its source into a plumbing system, such as is ordinarily installed in residences, is of such structure and character as to become inoperative at times by reason of its deterioration through corrosion and rust. These conventional stop and waste valves are usually provided with means to allow the water in the system to drain out but such means are ordinarily inadequate because the apertures through which the water is allowed to pass out are small and are eventually stopped or plugged up by the soil, being ordinarily buried in the ground, or by corrosion or rust.

Moreover, it has been found that these ordinary types of stop and waste valves, due to their unsatisfactory structure and inefficient operation, must be replaced at certain intervals which necessitates considerable expense and trouble. Very often they are relied upon to drain the pipes in freezing weather and fail to function, causing the pipes to freeze and burst necessitating the expenditure of great sums of money for repairs.

The invention herein described is designed to eliminate such difficulties and provide a device capable of easy operation at all times and which is completely reliable.

Accordingly, the invention is provided with a box, or housing 1, preferably rectangular in shape, as shown in Figures 1 and 2, one side of which is detachable to provide a means whereby the mechanism can be easily accessible. The detachable side or plate is secured to the invention by means of suitable stud bolts threaded into the sockets 2 arranged around the outer edge of the housing 1, as exemplified in Figure 1, a suitable gasket being first placed between the detachable plate and housing 1, as shown in Figure 2.

A pipe 3 which is connected with the source of supply (not shown) is threaded into a boss at the top of the housing 1. This arrangement is also shown in Figure 1. A pipe 4 is threaded into one side and near the bottom of the housing 1 through which the water passes into the plumbing system and to the various outlets therein. The pipe 4 is shown in Figures 1 and 2.

Having particular reference to Figure 2 it will be seen that two pipes 5 and 6 connect with the interior of the housing 1 in the bottom and adjacent to one end of the latter, the function of these pipes 5 and 6 being later described.

Figure 3, as previously stated, illustrates the preferred types of valve closure 7 used in the invention and which will be more specifically described as the description proceeds.

The inlet pipe 3, as well as the pipes 5 and 6, are provided with the valve closures 7, previously referred to, which latter are provided with projections 8 which are threaded into the valve heads 9, the projection 8 extending through washers 10 of rubber, or other suitable material, which are apertured so as to surround the projection 8 and provide a seat which, when the valve is closed, will engage the ends of the pipes 3, 5, and 6, to prevent the passage of the liquid therethrough.

Figure 1 shows the inlet, or source line, 3 open to permit the water from the source of supply to pass into the housing 1 and out through the system line 4.

Figure 5 illustrates a pair of arms 11 which operate the valves 9 on each of the pipes 5 and 6, either function being illustrated more particularly in Figure 2. Intermediate the ends of the arms 11 are provided slots, as shown in Figure 5, through which pins 12 are inserted to pivot the arms 11 to the bracket 13 secured to the top of the housing 1, the latter having two vertically disposed sides, through the lower ends of which the pins 12 are inserted, as shown in Figures 1 and 2. A horizontally disposed shaft or rod 14 is arranged through annular apertures in the end of the arms 11, as exemplified in Figure 2, and on each end of the rod 14, links 15 are secured, the latter being also pivotally attached to the valve heads 9 which seat themselves on the ends of the pipes 5 and 6, as shown in Figures 1 and 2. The links 15 are pivotally attached to each of the ends of the horizontal rod 14 and to the valve heads 9.

Arranged oppositely to the arms 11 is another arm 16, the latter being illustrated in detail in Figure 4. The arm 16 is provided with two slots, as shown in Figure 4, one of which is situated at one end of the arm 16 while the other is disposed intermediate the ends of the latter. An aperture is provided in the opposite end of the arm 16.

With reference to Figures 1 and 2, it is pointed out that a bracket 17 is provided which latter is secured to the bottom of the housing 1, its two sides projecting upward so that a pin can be inserted through the slot intermediate the ends of the arm 16 so that the latter can be pivotally operated within the bracket 17, as shown in Figures 1 and 2. A substantially U-shaped member 18 is pivoted by means of a pin 19 to the slotted ends of the arms 11 and 16, as shown in Figure 1. The member 18 is secured by means of a screw, or the like, to the lowermost end of the plunger 20, the latter having a threaded portion 21 which operates through the neck and packing nut assembly 22, the latter illustrated in Figure 1.

The opposite apertured end of the arm 16 is pivoted to one end of the links 23 which latter are also pivoted to valve head 9 which operates against the end of the supply line 3, shown in Figure 1.

A rod 24, preferably square, is provided with a longitudinal key way, or slot 25 which latter receives the end of a set screw 26 threaded through the upper portion of plunger 20 as shown in Figure 1. It is understood that the rod 24 can be of varying lengths, depending upon the use to which the invention is applied, it being possible to provide a rod 24 of such length as will extend upward from a point beneath the soil to the level of the ground or the floor of a building and may even be extended from an upper story floor to the basement or to a point in the ground beneath the house.

As previously mentioned, the plunger 20 is threaded through the neck and packing nut assembly 22 which is provided with a neck portion 27 in which a lubricant can be introduced to insure free movement of the plunger 20 at all times and prevent the latter from becoming corroded or otherwise inoperative. A packing gland or stuffing box 28 is threaded to the lower portion of the neck 27 where the latter enters the boss in the top of the housing 1, as shown in Figure 1.

Referring to Figure 3 in which the preferred type of valve closure 7 is illustrated, it will be seen that this member is preferably cylindrical in shape and is provided with a pair of opposingly situated annular apertures 29 through which the liquid passes when the valve is open, as shown in Figure 1.

In operation, therefore, when it is desired to shut off the source of supply from the water main and prevent its passage into the plumbing system, when the rod 24 is rotated by means of a suitable hand grip, the plunger 12 is rotated and therefore urged downward causing the ends of the arms 11 and 16 pivoted to the lower end of the said plunger 20 to move downward, the outer ends of the said arms moving upwardly, by reason of the pivot points in the brackets 13 and 17, which movement will seat the washer 10 against the lower end of the pipe 3 and shut off the passage of liquid through the apertures 29 in the valve 7 when they are urged upwardly into the pipe 3. At the same time, the washers 20, as shown in Figure 1 are seated upon the upper ends of the pipes 5 and 6 will be displaced upwardly to allow the liquid within the housing 1 and the plumbing system, the latter communicating with the housing 1 through the pipe 4, to pass out into the soil or into a sewer line to which one of the pipes 5 and 6 can be connected.

As previously mentioned, one of the pipes 5 and 6 is connected to the hot water line in the plumbing system so as to permit the pipes and the hot water heater to be drained as well as the cold water pipes with one operation.

When the mechanism of the device is in the position as shown in Figure 1, that is, when the valve 7 of the pipe 3 is open, the passage of the water through the system is not interrupted. While one of the pipes 5 and 6 is connected with the hot water line the passage of the hot water through the system is not interfered with so long as the washers 10 are seated upon the ends of these pipes 5 and 6, as shown in Figure 1. In other words, the length of pipe extending from the hot water line to one of the pipes 5 and 6 remains a "dead" line in that such water as may be in the line will remain there without flowing so long as the valves upon the pipes 5 and 6 are closed.

It will be seen then, that when the valves seated upon the ends of the pipes 5 and 6 have been raised the water from the hot water line connected with one of these pipes can pass into the housing 1 and becomes mixed or mingled with the cold water passing into the housing 1 through the pipe 4 and out of the housing 1 through the other of these pipes 5 and 6.

While the arrangement just described is not shown in the drawing, it is obvious that it does not matter which of the two pipes 5 and 6 is connected with the hot water line (not shown) nor which is connected to the sewer or drain since such arrangement will function satisfactorily. As previously stated, the primary object of the invention is to provide a means whereby the source of supply can be cut off and the entire plumbing system, including the hot water heater and lines, can be drained by the simple operation of the vertical shaft 24 as previously described.

Although the invention has been described with great particularity, it is understood that certain changes and modifications can be resorted to from time to time provided such changes and modifications are considered to be within the scope and intent of the appended claims.

What is claimed is:

1. A compound compression stop and waste valve including a housing, inlet and outlet pipes communicating with the said housing, a closure for certain ones of said pipes, a double fulcrum assembly operatively disposed within the said housing to actuate all of the said closures simultaneously and one of the said closures oppositely to the others of the said closures.

2. A stop and waste valve for a plumbing system comprising a housing, a supply line communicating with the said housing and a closure therefor, a waste line and a hot water line communicating with the said housing and a closure for each of the said last named lines, means operatively disposed within the said housing to operate all of the said closures simultaneously, the first named closure functioning oppositely to the last named closures.

3. A stop and waste valve for a plumbing system comprising a housing, a supply pipe communicating with the said housing, a closure for the said supply pipe and a lever for operating the same, an inlet opening from a hot water line into the said housing, a discharge opening from the said housing, closures for each of the last named openings and means to actuate the same simultaneously and alternately with the first named closure.

In testimony whereof, I set my hand, this 29th day of March, 1929.

CHARLES A. NEWBERG.